United States Patent [19]

Jeans

[11] Patent Number: 4,637,439

[45] Date of Patent: Jan. 20, 1987

[54] MINI-REGULATOR VALVE ASSEMBLY

[75] Inventor: Edward L. Jeans, Gwent, Wales

[73] Assignee: Cadbury Schweppes, PLC, London, United Kingdom

[21] Appl. No.: 508,558

[22] Filed: Jun. 28, 1983

Related U.S. Application Data

[63] Continuation-in-part of Ser. No. 232,977, Feb. 9, 1981, abandoned, which is a continuation-in-part of Ser. No. 200,021, Oct. 23, 1980, Pat. No. 4,353,252.

[51] Int. Cl.$^4$ ................................................ B65B 3/04
[52] U.S. Cl. ...................................... 141/18; 141/302; 137/522; 251/339; 73/293; 116/227; 350/96.15
[58] Field of Search .................................. 141/285–310, 141/346–362, 18–27; 137/522, 535, 528, 540, 454.2, 454.5; 251/339, 149.7, 149.6, 144, 321, 322; 73/293; 116/227; 350/96.15, 96.19

[56] References Cited

U.S. PATENT DOCUMENTS

| | | | |
|---|---|---|---|
| 1,427,854 | 9/1922 | Rogers | 137/498 |
| 1,958,768 | 5/1934 | Eastman | 251/149.7 |
| 2,524,052 | 10/1950 | Grant, Jr. | 137/596 |
| 2,548,352 | 4/1951 | Courtot | 116/227 |
| 2,611,390 | 9/1952 | Johnson | 137/494 |
| 2,625,016 | 1/1953 | St. Clair | 222/3 |
| 2,809,658 | 10/1957 | Franz et al. | 137/498 |
| 2,888,949 | 6/1959 | Evans | 251/333 |
| 2,983,385 | 5/1961 | Botstiber | 137/454.5 |
| 3,612,099 | 10/1971 | MacManus | 137/454.5 |
| 4,363,424 | 12/1982 | Holben et al. | 222/4 |

FOREIGN PATENT DOCUMENTS

| | | | |
|---|---|---|---|
| 80730 | 5/1895 | Fed. Rep. of Germany | . |
| 1192490 | 7/1959 | France | . |

Primary Examiner—Houston S. Bell, Jr.
Attorney, Agent, or Firm—Kenyon & Kenyon

[57] ABSTRACT

A mini-regulator valve assembly for providing a continuous supply of fluid at a predetermined pressure from a source of high pressure fluid. The valve has a first member adapted to join with the fluid source and a second member disposed for movement relative to the first member, one of the members forming a valve seal and the other forming a sealing edge cooperating therewith. The valve is further provided with a first biasing spring, a second biasing spring and an actuator. The first biasing spring biasing the second valve member against the first valve member and the second biasing spring acting on the actuator such that when the second biasing spring moved inward, the actuator acts on the second valve member moving the valve seat and edge away from each other thereby opening the valve, the first spring in combination with the pressure of the fluid passing through the valve ending close to the valve as the pressure builds up and thereby obtaining a regulating affect.

25 Claims, 7 Drawing Figures

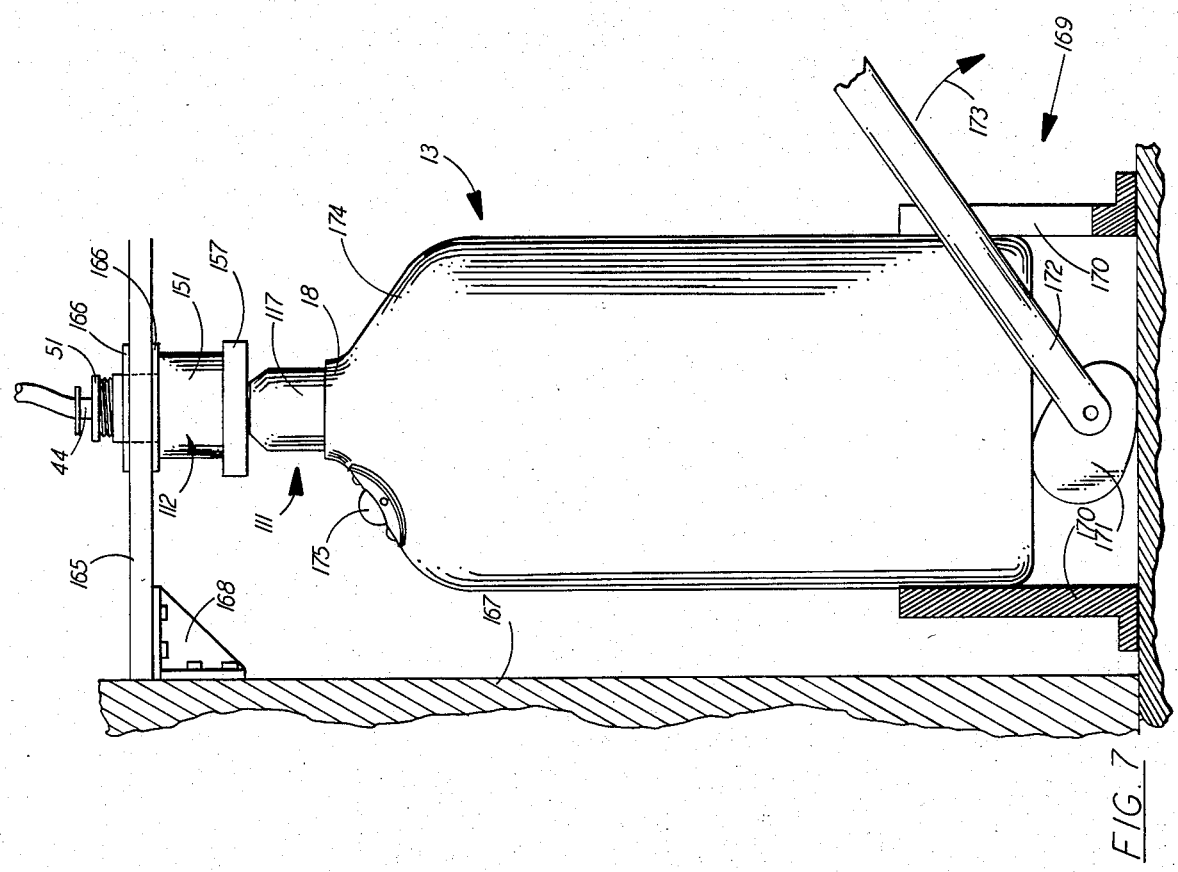
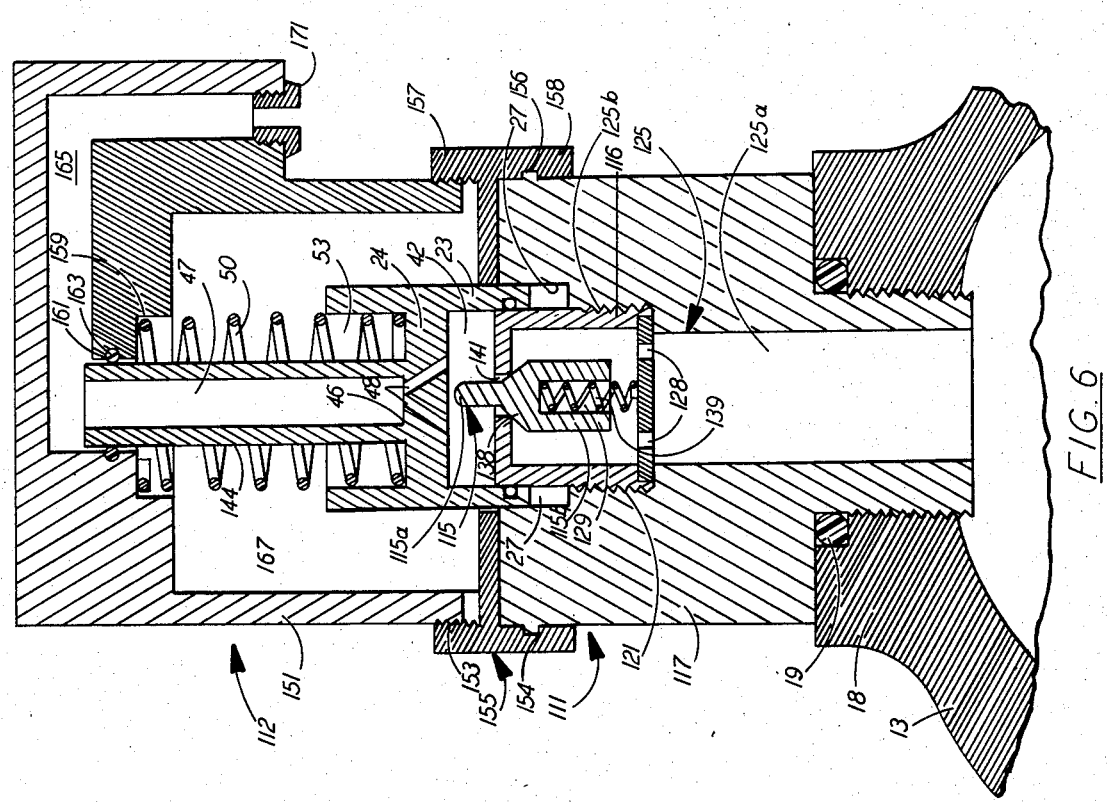

MINI-REGULATOR VALVE ASSEMBLY

RELATED APPLICATIONS

This invention is a continuation-in-part of U.S. Ser. No. 232,977 filed Feb. 9, 1981, and now abandoned, which is a continuation-in-part of Ser. No. 200,021 filed Oct. 23, 1980, now U.S. Pat. No. 4,353,252 the disclosures of which is hereby incorporated by reference.

BACKGROUND OF THE INVENTION

This invention relates to pressure regulators in general and more particularly to a mini-regulator valve assembly for providing a continuous supply of gas at a predetermined pressure from a source of high pressure gas stored in a pressurized cylinder.

When dispensing compressed gases from a high pressure cylinder, it is typically necessary to provide means to make a connection to the cylinder, to provide a valve to permit supply of gas thereafter, and to provide means to then reduce the pressure of the gas from the cylinder to the desired level. Typically, the cylinder includes a shut-off valve so that, after a connection is made, the valve can be opened to permit a flow of gas. Typically, a regulator is disposed somewhere in the line leading from the cylinder. In various applications, there is a need for a quick disconnect to and from such a cylinder. One method of making such a quick connect and disconnect is described in U.S. Pat. No. 4,363,424. In the device disclosed therein, a check valve is installed in the cylinder. The coupling member when inserted into an appropriate bore in the cylinder in a sealing manner opens the check valve to immediately permit the flow of gas without a separate valve. Integral with the member inserted into the bore but external to the cylinder is a regulating valve. As described, a valve actuator comprises a diaphragm, a spring loaded diaphragm fitting, and an actuating lever pivotable thereby, the lever having at one end a plug of resilient material engageable with the mouth of an elongate hollow bushing. At the other end of the bushing is a block of porous material, through which block the flow of gas is prevented by a spring loaded poppet valve.

The regulator valve described in of the above-identified patent has a multitude of parts and is, therefore, difficult and expensive to manufacture and market.

An object of the present invention is to provide a simplified, relatively inexpensive regulator valve assembly which is easy to install, for example, in beverage dispensing systems.

SUMMARY OF THE INVENTION

In accordance with the present invention, a valve which incorporates means for regulating and pressure reducing thereby avoiding the need for a regulator separate from means for quickly connecting to the cylinder is provided.

In general terms this is accomplished with
A regulating valve having:
(a) a first valve member adapted to be retained in an opening in the gas cylinder;
(b) a second valve member disposed for movement with respect to the first valve member, one of the first and second valve members forming a valve seat and the other forming a sealing edge cooperating with the seat thereby forming an outlet valve from the cylinder;
(c) first biasing means biasing the second valve member against the first valve member so as to bring the sealing edge into contact with the seat and close the valve;
(d) an actuator for acting on the second valve member; the actuator having an outlet passage, the actuator supported for limited axial motion;
(e) means associated with the actuator forming an inner chamber in communication with the outlet valve, the inner chamber having an outer surface area greater than the area of the outlet passage and an outer chamber; and
(f) at least one port formed in the actuator establishing communication between the inner chamber and the outlet passage in the actuator;
(g) an axially adjustable support surface; and
(h) second biasing means disposed in the outer chamber between the support surface and the actuator, whereby axially inward movement of the actuator will cause it to move the seat and edge apart to permit a flow of gas into the inner chamber and through the ports, the gas thereupon acting over the outlet passage along with the biasing force of the second biasing means and aided by the biasing force of said first biasing means to tend to close the valve comprising the valve seat and the edge as pressure builds up to the desired valve to thereby obtain a regulating effect.

In one embodiment the regulating is accomplished with a quick disconnect valve inserted in an opening in the neck of the gas cylinder, including a first valve member fixedly and outwardly disposed into the opening in a sealing manner, a second valve member movably and inwardly disposed in the opening, one of the valve members forming a valve seat surface and the other a sealing edge, and a spring acting against and biasing the second member against said first member. An actuator is provided so that a mating fitting will move the second valve member away from the first valve member.

To obtain pressure reducing/regulating operating, the actuator is coupled to the second valve part through a biasing spring and is formed with a piston or diaphragm sealing of the first chamber. Pressure in the chamber acts against the biasing member, which in turn is at a position corresponding to a desired pressure, to control the second valve member to obtain the desired pressure at the outlet.

A regulator valve in accordance with another embodiment of the present invention comprises an actuator assembly with an actuator body, preferably in the form of a sleeve having a transverse divider spaced from the sleeve ends forming chambers, the actuator body being shiftable for moving a valve member in a valve housing from a seated or closed position to an open position to connect a pressurized cylinder to a regulator valve output port upon the gas pressure at the output port falling below a predetermined pressure. A compression spring in an outer chamber biases the actuator body towards the valve member, while gas in an inner pressure chamber between the actuator body and the valve housing exerts a force opposed to the biasing spring force on the actuator body. An additional force on the actuator body, arising from gas pressure in an outlet on the output port side of the actuator body, acts in concert with the biasing spring force. The outlet and pressure chamber are linked via one or more gas flow parts provided in the divider of the actuator body, the first chamber having a greater effective pressure area than the outlet has on the actuator body.

The actuator body has a cylindrical flange (i.e., a sleeve end) extending longitudinally towards the valve assembly, the flange engaging the valve housing with a gas tight fit. The flange is slidably inserted in an annular recess formed between the valve housing and a carrier body.

An elongate hollow tube defining the outlet is connected to the divider of the actuator body, the biasing spring helicoidally surrounding the probe and having one end seated in an annular recess, the longitudinal walls of which recess are formed by the probe and an end of the actuator sleeve. This sleeve end is slidably inserted in a spring housing.

BRIEF DESCRIPTION OF THE DRAWINGS

FIG. 6 is a cross-sectional view of another regulator valve assembly according to the present invention, showing this assembly attached to a pressurized gas storage cylinder.

FIG. 7 is side view, on a reduced scale, of the regulator valve assembly of FIG. 6 in a disengaged state, showing the gas cylinder and a coupling mechanism.

DETAILED DESCRIPTION

Figure 1:
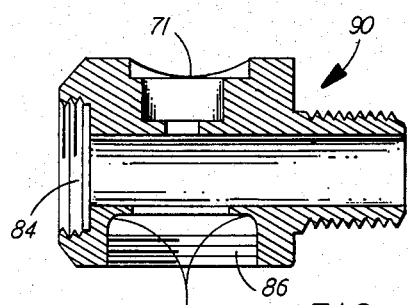
FIG. 1 is a cross section of a fitting which may be used with the present invention.

As illustrated by the cross section of FIG. 1 a fitting 90, which is adapted to be screwed into the opening at the top of the neck of a gas cylinder, contains, in addition to an opening 47 or 49 for a valving mechanism or other device, an opening 71 for containing a burst disc assembly. This opening is threaded and the conventional assembly with a burst disc may be screwed therein.

Figure 2:
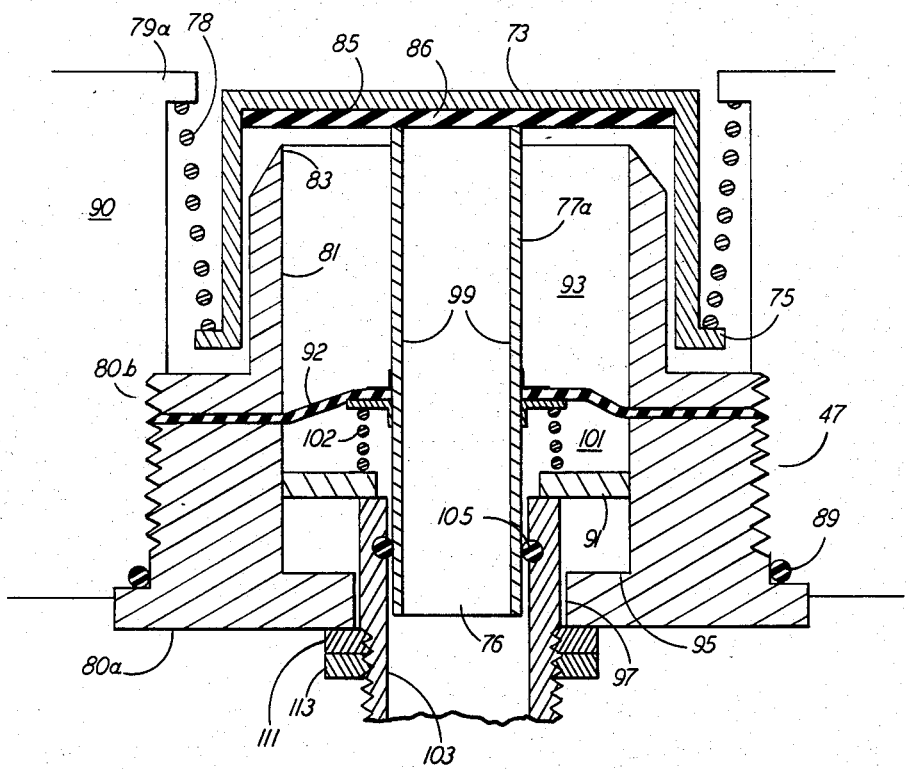
FIG. 2 is a cross-sectional view of a quick disconnect valve according to the present invention which permits regulating adapted for insertion into the fitting of FIG. 1.

The valve of FIG. 2, functions as a quick disconnect valve and regulator valve. In the illustrated embodiment, a spring 78 acts between a flange 75 and a flange 79a formed in the wall of the fitting 90, or on the wall of a cylinder. A nut 80 is split into parts 80a and 80b. Part 80b is inserted or threaded into the inner end of bore 47 and contains a portion 81 with a sharp edge 83. Edge 83 cooperates with a valve seat 86. An actuator in the form of a tubular member 77a with a central bore 76 forming an outlet passage is provided. Tubular member 77a is supported for axial motion by a diaphragm 92. The diaphragm is secured between the part 80b and the threaded nut part 80a and divides the bore into an inner chamber 93 and outer chamber 101. Part 80a is sealed in the opening 47 by means of an "O" ring seal 89. An axially movable support surface in the form of an annular disc 91 is provided and is capable of axial movement within the outer chamber 101 formed within the part 80a. A biasing spring 102 extends between support surface 91 and diaphragm 92. In a rest position, support surface 91 is thus biased against a flange 95 formed at the outside of the nut part 80a. The flange is defined at one edge by an entrance opening or bore 97. Ports 99 of a radial nature are formed in the tubular member 77a. Ports 99 couple inner chamber 93 to bore 76 forming the outlet passage. During operation, a probe 103 on the device to which the cylinder is to be connected is inserted into the bore 97. It is provided with an "O" ring seal or the like 105 sealing against the tubular member 77a. Insertion causes the axially movable support surface 91 to move inward. The inward movement of the support surface 91 results in a similar inward movement of the diaphragm and with it the tubular member 77a. This moves the valve seat surface 86 away from from the sharp edge 83 against the force of the biasing spring 78. This permits a flow around the cup-shaped member 73 and into the chamber 93. Flow from the chamber 93 through the ports 99 and bore 76 takes place. The flow continues out from the cylinder through the probe 103. However, as gas is admitted to the chamber 93 it acts on the diaphragm 92 to offset the force of the spring 107. The tubular member 77a thus tends to move outwardly closing off the valve formed between the sharp edge 83 and the valve seat 86. In this manner regulation and pressure reducing takes place with the valve so formed, opening and closing to maintain a pressure at the chamber 93, and thus at the outlet, which is determined by the strength of the spring 102 and the position of the support surface 91. This position is in turn determined by the position of a nut 111 threaded on the probe 103. A lock nut 113 is provided so that once the desired pressure is established it may be maintained.

Figure 3:
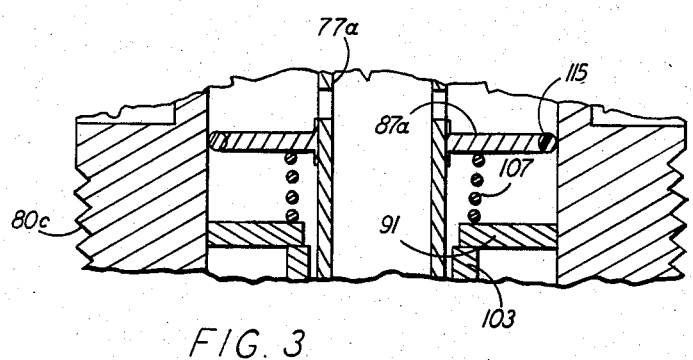
FIG. 3 illustrates a modified version of the valve of FIG. 2.

FIG. 3 illustrates an alternative manner of implementing the regulator and pressure reducing valve of FIG. 2. In this device, a nut 80c which is an integral unit and equivalent to the parts 80a and 80b of FIG. 3 is used. In this embodiment, the spring 107 acts between the support surface 91 and a rigid annular member 87a attached to the tubular member 77a. A seal 115 is inserted at the edge of the rigid member 87a. This then works as a piston and, again, the member 77a is free to move inward and outward axially.

Figure 4:
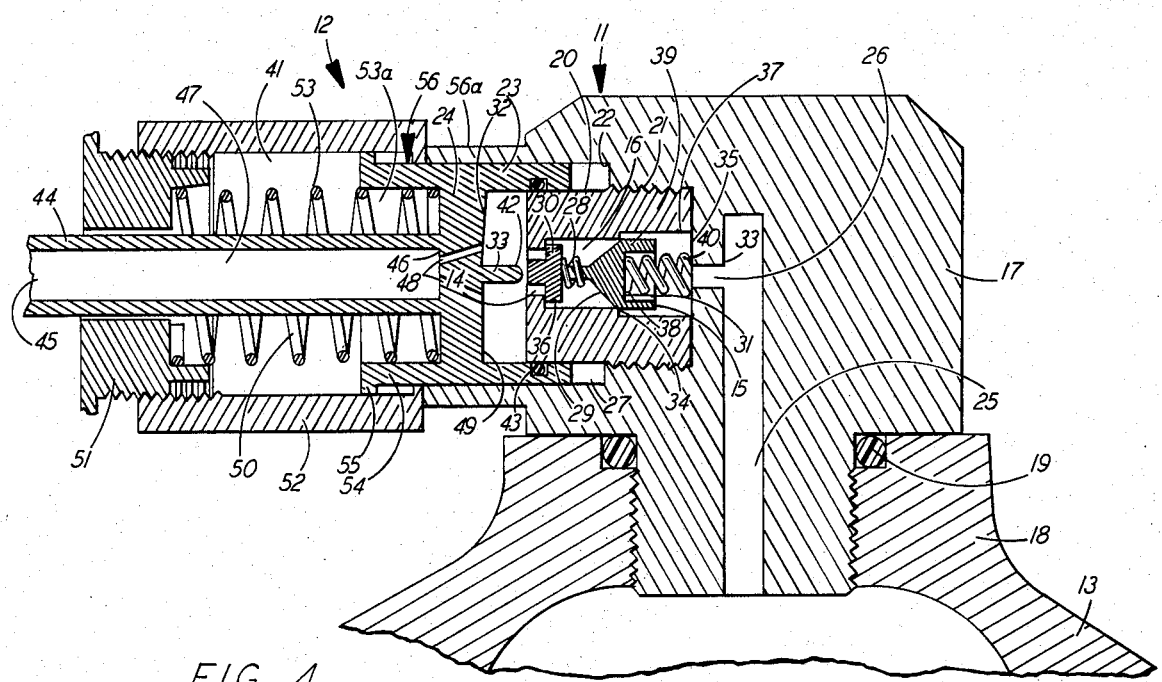
FIG. 4 is a cross-sectional view of a further regulator valve assembly in accordance with the present invention, showing the assembly attached to a pressurized gas storage cylinder.

As illustrated in FIG. 4, a further regulator valve according to the present invention comprises a valve assembly 11 and an actuator assembly 12 which cofunction to control the release of gas such as carbon dioxide from a pressurized source 13 in the form of a cylinder. Valve assembly 11 includes a dust cover 14 and a poppet valve 15 contained in a cylindrical valve housing 16 in turn threadedly mounted and sealed in a fitting or carrier block 17 itself threadedly secured in the neck 18 of cylinder 13. An elastic O-ring 19 is provided for preventing leakage of gas from cylinder 13 via the threaded joint between carrier block 17 and cylinder neck 18. It is also possible to extend the neck of the cylinder and threadedly mount the valve housing 16 directly therein. Thus, reference to the valve housing 16, for example, being mounted in the neck of the cylinder is meant to include mounting directly in the neck or in an extension of the neck formed by a fitting carrier such as carrier 17.

Valve housing 16 has a cylindrical outer surface 20 provided at one end with a screw thread 21. Fitting 17 is formed with a bore 22 having an inner bore portion equal in diameter to the outer surface 20 of valve housing 16 and an outer bore portion with a diameter equal to the sum of the diameter of outer surface 20 plus twice the thickness of an annular or circumferential flange 23 projecting longitudinally from an actuator member 24. The inner portion of bore 22 is threaded for receiving screw thread 21. Bore 22 communicates with the interior of pressurized cylinder 13 via a longitudinal bore 25 and a transverse connecting bore 26 in fitting 17.

It is to be noted that upon the screwing of valve housing 16 into fitting 17, an annular recess 27 is formed between the fitting and the valve housing for receiving actuator flange 23.

Poppet valve 15 is aligned with dust cover 14 for shifting longitudinally with respect to bore 22. Dust cover 14 has a disc-shaped portion 30 integral with a longitudinally extending cylindrical portion or shank 32 on the side thereof opposite a shank 33 with a hemispherical end on actuator assembly 12. This assures that a slight misalignment of the actuator, i.e. if it is rotated slightly, will not affect the setting of the regulator. The poppet valve 15 includes a conical portion 29 which is biased against a sharp annular edge or seat ring 34 forming a valve seat. Seat 34 is located at a step 17 bore 37 in valve housing 16.

Disc-shaped portion 30 is provided at its edges with longitudinal notches or recesses 36 for permitting the passage of pressurized gas upon the disengagement of poppet valve 15 from valve seat by actuator assembly 11. Poppet valve is biased against seat 34 by a helical spring 40. Spring 40 acts between a surface 35 at the end of bore 22 in carrier block 17 and cylindrical recess 38 in a cylindrical part 39 of poppet valve 15. Helical spring 28 is compressed between the poppet valve 15 and disc shaped portion 30 to hold the dust cover closed when the cylinder is not in use.

The cylindrical body 32 of dust cover 14 projects through an aperture 41 in housing 16 into a pressure chamber 42 defined by actuator member 24, flange 23 and housing 16. An O-ring seal 43 is imbedded in flange 23 (or the outer surface of housing 16 to prevent damage) for engaging the outer surface 20 of housing 16 in a gas tight fit to prevent leakage of gas from pressure chamber 42.

Actuator assembly 12 supports a hollow elongate tube 44 connected at one end to actuator member or body 24 and having at an opposite end an output port 45 communicating, for example, with a non-illustrated beverage dispenser. Tube 44, together with a surface 46 of actuator member 24 enclosed or defined by the probe, forms a outlet passage chamber 47. Chambers 42 and 47 communicate via one or more holes 48 extending through actuator member 24.

It is to be noted that surface 46 is smaller than a surface 49 located on a side of actuator member 24 opposite tube 44 and forming a wall of pressure chamber 42. Gas in pressure chamber 42 and outlet passage 47 exerts a net force on the actuator body 24 proportional to the difference between the area of surface 49 and the area of surface 46.

An additional force is exerted on actuator member 24 by a helical biasing spring 50 concentric with and surrounding tube 44 in another chamber 53 at atmospheric pressure. Biasing spring 50 engages at one end a screw cap 51 threadedly mounted in a spring housing 52 for adjusting the compression of spring 50 and thereby the biasing force exerted by the spring on actuator member 24. At an end opposite screw cap 51 biasing spring 50 is seated in an annular recess 53a whose longitudinal walls are formed by tube 44 and a circumferential or annular flange 54 concentric with tube 44 and extending from actuator member 24 in a direction opposite valve housing 16 and pressure chamber 42. Flange 54 is slidably inserted in spring housing 52 and is provided with an outwardly extending annular lip 55 which engages an inside surface of the spring housing. Housing 52 is fixed with respect to block 17 by an extending sleeve 56a.

Circumferential flanges 23 and 54 are continuous with one another and can be viewed as opposite end portions of a sleeve 56, these end portions being defined by a transverse divider in the form of actuator member 24 spaced from the ends of the sleeve.

The regulator valve shown in FIG. 4 delivers a continuous supply of gas at a predetermined pressure from cylinder 13 to a beverage dispenser or other device connected to output port 45. The magnitude of the predetermined pressure can be adjusted by screwing cap 51 into or out of spring housing 52. The further the cap is screwed into the housing, the greater the pressure of the gas delivered at output port 45.

During operation of the regulator valve of FIG. 4, both chambers 42 and 47 contain gas from cylinder 13. As long as the force exerted on actuator member 24 (and, therefore, sleeve 56) by the gas in chamber 42 exceeds the total force exerted on the actuator member by compression spring 50 and the gas in passage outlet 47, the actuator member remains disengaged from dust cover 19 and thus poppet valve 15. Upon a falling of the pressure at output port 45 below the predetermined pressure, the total force exerted by spring 50 and the gas in passage 47 exceeds the force exerted in the opposite direction by the gas in chamber 42 plus various friction forces. Actuator sleeve or body 56 then moves towards valve assembly 11 and the shank 33 of actuator member 24 engages dust cover 14 which in turn engages poppet valve 15, whereupon this valve is unseated in opposition to the force exerted by helical spring 39 and to the net pressure exerted on the poppet valve 15 by the gas in valve housing 16.

It is to be recognized that the total force exerted by compression spring 50 and the gas in outlet passage 47, along with the atmospheric pressure in chamber 53 acting on actuator 24 must overcome static friction forces as well as the countervailing force exerted by the gas in chamber 42, in order to move the actuator body towards the poppet valve 15. Moreover, in order to unseat poppet valve 15, the forces exerted by compression spring 50, the gas in passage 47 and atmospheric pressure must exceed the sum of (1) the force exerted on actuator body 56 by the gas in chamber 42, (2) friction forces, (3) the force exerted on poppet valve 15 by helical spring 40, and (4) the force exerted on poppet valve 15 by gas inside valve housing 16, minus the force exerted on poppet valve 15 by gas in pressure chamber 42.

Figure 5:
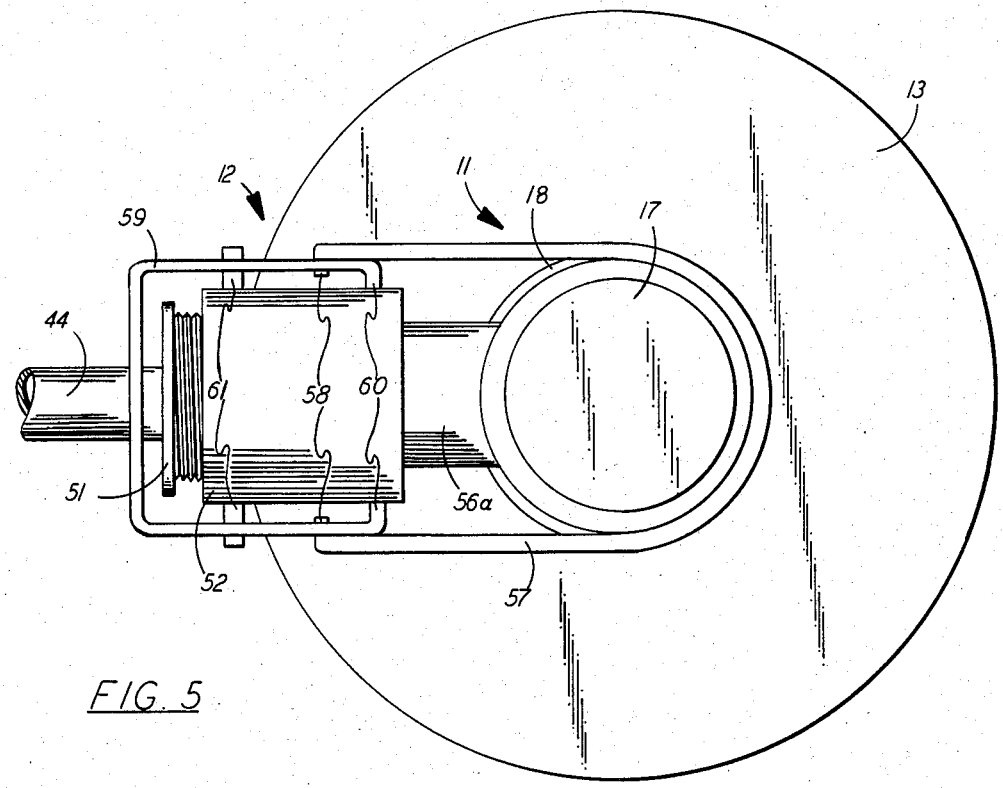
FIG. 5 is a top view, on a smaller scale, of the regulator valve assembly and cylinder of FIG. 4.

As shown in FIG. 5, actuator assembly 12 is secured to valve assembly 11 by a U-shaped retaining yoke 57 which has an arcuate shape at one end for engaging carrier block 17 and a pair of turned-in fingers 58 at an opposite end for pivotably coupling the yoke to a C-shaped handle 59. Handle 59 is itself swivelably fastened at 60 to spring housing 52.

Actuator assembly 12 is secured to valve assembly 11 by first inserting the end of circumferential flange 23 into annular recess 27. Yoke 57 is subsequently pivoted from a more or less vertical position into an orientation substantially parallel to sleeve 56, whereupon handle 59 is disposed in an at least partially vertical position and yoke 57 curves at its one end about carrier block 17. Handle 59 is then swung downwardly about pivot points 60 until the handle contacts a pair of lugs 61 projecting laterally from spring housing 52. The pivoting of handle 59 causes yoke 57 to engage carrier block 17 and increases the extent to which circumferential flange 23 is inserted into recess 27. Moreover, the leverage provided by handle 59 and yoke 57 facilitates the opening of poppet valves 14 and 15 in opposition to the pressure exerted thereon by the gas inside cylinder 13. Other way of attachment are, of course also possible.

As illustrated in FIG. 6, a regulator valve in accordance with the present invention may comprise the actuator assembly of FIG. 4 together with a valve assembly 111 including a spring loaded poppet valve 115 shiftably mounted in a cylindrical valve housing 116 in turn threadedly mounted and sealed in a carrier block 117. As heretofore described with reference to carrier block 17 in FIG. 4, block 117 is screwed into the neck 18 of pressurized cylinder 13. A bore 125 extends longitudinally through carrier block 117 from cylinder 13, the bore having a nonthreaded innermost portion 125a, a threaded middle portion 125b equal in diameter to an outer cylindrical surface 120 of valve housing 116 and a nonthreaded outer portion 125a having a diameter equal to the sum of the diameter of cylindrical surface 120 plus twice the thickness of actuator flange 23.

An inner end of valve housing 116 is provided with a screw thread 121 for cooperating with threaded bore portion 125b. At the base of bore portion 125b, a disc 139 with off-axis openings 128, is placed forming a base for valve housing 116. Upon the screwing of housing 116 into carrier block 117, an annular recess 127 is created for receiving sleeve 23, as heretofore described with reference to FIG. 4.

Valve housing 116 is thus provided with a plurality of inlet ports or apertures 128 at an inner end for permitting the flow of gas from bore portion 125 into housing 116. At an end opposite inlet ports 128, housing 116 has an outlet port or aperture 141, through which gas flows from housing 116 to pressure chamber 42 upon a disengagement of poppet valve 115 from a valve seat 138 formed by an inner edge of outlet aperture 141 or by a separate seat.

Poppet valve 115 comprises three parts intergrally formed: (1) a first cylindrical end section 115a projecting into pressure chamber 42 through outlet aperture 141, (2) a second cylindrical end section 115b larger in diameter than end section 115a and contained in housing 116, and (3) a conical midsection 115c joining the two end sections 115a and 115b. Valve seat 138 contacts midsection 115c, while end section 115b is provided with a cylindrical recess or slot 129 for receiving a helical biasing spring 139.

To permit a rigid connection with the regulator, housing 151 is provided. It is generally cylindrical with its inner end 153 threaded. A flanged member 155 with internal threads on its outer flange 158 is placed with its inner flange 158 over block 117. Spring 50 acts between a recess 159 at the outer end of housing 151, and actuator surface 24. Adjacent recess 159 is a bore 161 with an O-ring seal 163 surrounding tube 144 and sealing an outlet passage 165 from the inside 167 of housing 151. The end of passage 165 is threaded for an outlet fitting 171. This housing may be connected to block 117 using a rotating camming action, with lugs on block 117 and grooves 154 on the inside of flange 158.

The operation of the regulator valve of FIG. 6 is essentially the same as the operation of the regulator valve of FIG. 4.

An alternate connecting system (which with a full connector replacing the actuator may be used for filling is illustrated in FIG. 7.

As illustrated in FIG. 7, actuator assembly 112 can be attached to a horizontal support 165 such as a shelf by means of a pair of threaded washers or fittings 166, the shelf being mounted on a wall 167 or other vertical support by one or more brackets 168.

Actuator flange 23 is inserted into annular recess 27 and flange 157 around block 117 (see FIG. 6) by means of a coupling device 169 comprising guide elements 170, a cam 171 and a lever 172. Prior to the placing of a gas filled cylinder 13 below actuator assembly 112, lever 172 is in an elevated position, as shown in FIG. 7. The filled cylinder is then slid laterally into position between guides 170. Upon the placement of cylinder 13 between guides 170 and on cam 171, lever 172 is pivoted downwardly in the direction of arrow 173. Cam 171, which is rigid with lever 172, rotates in the direction of arrow 173 upon the pivoting of the lever, thereby shifting cylinder 13 and valve assembly 111 vertically upwardly so that the latter engages actuator assembly 112, and in particular so that actuator flange 23 is inserted into annular recess 27. A hook (not illustrated) or other device may be provided for locking or securing lever 172 upon installation of the regulator valve assembly. With the cam designed to be at its maximum radius as shown automatic locking takes place and further securing is not needed.

As illustrated in FIG. 7 pressurized cylinder 13 is provided on a sloping flank 174 with a burst disc 175. Such a disc ruptures if the gas in the cylinder exceeds a pre-established threshold.

What is claimed is:

1. A regulating valve for use in a gas cylinder having an opening formed therein comprising:
    (a) a first valve member adapted to be retained in the opening in the cylinder;
    (b) a second valve member disposed for movement with respect to said first valve member, one of said first and second valve members forming a valve seat and the other forming a sealing edge cooperating with said seat thereby forming an outlet valve from the cylinder;
    (c) first biasing means biasing said second valve member against said first valve member so as to bring said sealing edge into contact with said seat and close said valve;
    (d) an actuator for acting on said second valve member, said actuator having an outlet passage, said actuator supported for limited axial motion;
    (e) means associated with said actuator forming an inner chamber in communication with said outlet valve, said inner chamber having an outer surface of area greater than the area of said outlet passage, and an outer chamber;
    (f) at least one port formed in said actuator establishing communication between said inner chamber and said outlet passage;
    (g) an axially adjustable support surface; and
    (h) second biasing means disposed in said outer chamber between said support surface and said actuator, whereby axially inward movement of said actuator will cause it to move said seat and edge apart to permit a flow of gas into said inner chamber and through said ports, said gas thereupon acting over said outlet passage along with the biasing force of said second biasing means and aided by the biasing force of said first biasing means to tend to close the valve comprising said valve seat and said edge as pressure builds up to the desired value to thereby obtain a regulating effect.

2. A regulating valve according to claim 1, wherein:
(a) said first valve member comprises a cylindrical valve housing having a base and containing said sealing edge;
(b) said second valve member comprises a poppet valve with a conical outer surface and a cylindrical bore;
(c) said first biasing means comprise a helical spring disposed within said bore and acting between the base of said valve housing and said bore;
(d) said actuator comprises a member with inner and outer cylindrical flanges separated by a solid central wall, an actuating projection projecting from said wall and adapted to act upon said poppet valve when said inner flange is placed around said cylindrical valve housing, said inner flange surrounding said valve housing in a sealing manner;
(e) said inner chamber is formed by said central wall, the inner radial surface of said inner flange and the outer surface of said cylindrical valve housing a tube being attached to said central wall and extending outwardly forming said outlet passage, said outer chamber being the source between said tube and outer flange;
(f) said port is at least on passage between said inner chamber and said tube, extending through said central wall;
(g) said support surface comprises a hollow cylindrical housing having an inner end surrounding said outer flange and a nut adjustably threaded in its outer end forming an extension of said second chamber, said tube passing through said nut; and
(h) said second biasing means is a helical spring acting between nut and said central wall.

3. A regulating valve for use in a gas cylinder having an opening formed therein comprising;
(a) a first valve member having a central bore fixedly and outwardly retained in the opening in the cylinder;
(b) a second valve member inwardly disposed in said opening for movement therein, one of said first and second valve members forming a valve seat and the other forming a sealing edge cooperating with said seat;
(c) first biasing means biasing said second valve member against said first valve member so as to bring said sealing edge into contact with said seat and close said valve;
(d) an actuator for acting on said second valve member disposed within said central bore in said first valve member, said actuator having an outlet;
(e) means supporting said actuator for limited axial motion within said central bore, said means sealing said member within said central bore and dividing said central bore into an inner chamber and an outer chamber;
(f) ports formed in said actuator establishing communication between said inner chamber and the outlet in said actuator;
(g) an axially movable support surface disposed within said outer chamber;
(h) means for limiting the axially outward movement of said surface; and
(i) second biasing means disposed between said support surface and said actuator, whereby, a tubular probe may be inserted into said central bore acting against said axially movable support surface, and maintained in sealing contact with said actuator so as to receive a discharge from its outlet, with axialy inward movement of said support surface acting, through said biasing means on said actuator causing it to move said seat and edge apart to permit a flow of gas into said inner chamber and through said ports, said gas thereupon acting on said means supporting against the biasing force of said second biasing means to tend to close the valve comprising said valve seat and said edge to thereby obtain a regulating effect.

4. A valve according to claim 3 wherein said means supporting comprise a diaphragm extending between said first valve member and said actuator.

5. A valve according to claim 4 wherein said first valve membr is divided into first and second parts, said diaphragm sealingly engaging said first part and held fast between said first and second parts at its outer circumferences.

6. A valve according to claim 3 wherein said means supporting comprise an annular member sealed against the bore in said first valve member at its circumference thereby acting as a piston.

7. A regulator valve assembly for providing a continuous supply of gas at a predetermined pressure from a source of high pressure gas stored in a pressurized cylinder, comprising:
valve means mounted on the pressurized cylinder and including a valve housing and a shiftable valve member therein at least in part for preventing unintentional gas leakage from the pressurized cylinder, and
actuator means including: (a) a shiftable actuator body for contacting and moving said valve member from a closed position (b) a regulator valve outlet passage on one side of said actuator body, (c) biasing means for exerting on said actuator body a first force inwardly towards said valve member, (d) a chamber communicating with said cylinder upon an opening of said valve member on the other side of said actuator body and disposed between said valve housing and said actuator body for containing gas, exerting a second force opposed to first force on said actuator body, (e) at least one passageway in said actuator body extending from said chamber to said outlet passage, the effective pressure area in an outward direction on said actuator body acting against said biasing means being greater than the effective pressure area in said outlet passage acting in concert with said biasing means.

8. The regulator valve assembly defined in claim 7 wherein said actuator means further includes coupling means integral with said actuator body for slidably engaging said valve housing in a gas tight fit and for forming said chamber between said valve housing and said actuator body.

9. The regulator valve assembly defined in claim 8 wherein said coupling means includes a cylindrical flange extending longitudinally from said actuator body toward said valve housing.

10. The regulator valve assembly defined in claim 9 wherein said valve housing is threadedly mounted in the neck of said cylinder, said valve housing has a cylindrical outer surface and said flange has a uniform thickness, said neck being provided with a bore having an inner bore portion with a diameter equal to the diameter of said cylindrical outer surface and an outer bore portion with a diameter substantially equal to the sum of the diameter of said cylindrical bore portion plus twice the thickness of said flange, whereby upon a mounting of said valve housing in said cylinder, an annular recess is formed between said cylinder and said valve housing for receiving said flange.

11. The regulator valve assembly defined in claim 10, further comprising quick connection means for facilitating an insertion of said flange into said recess.

12. The regulator valve assembly defined in claim 11 wherein said quick connection means includes a cam.

13. The regulator valve assembly defined in claim 11 wherein said quick connection means includes a yoke pivotably mounted to said actuator means.

14. The regulator valve assembly defined in claim 7, wherein said outlet passage comprises a hollow elongate tube having an outlet port at one end and being connected at an opposite end to said actuator body.

15. The regulator valve assembly defined in claim 14 wherein said biasing means is a helical spring coiled about said probe, said actuator means further including a spring housing in which said biasing spring is disposed, a side of said actuator body opposite said valve housing being slidably inserted in said spring housing.

16. The regulator valve assembly defined in claim 15 wherein said actuator body is provided with a circumferential flange extending longitudinally in a direction away from said valve housing, said flange and said probe forming longitudinal walls of an annular recess, an end of said biasing spring being seated against said actuator body in said annular recess.

17. The regulator valve assembly defined in claim 16 wherein said actuator means further includes adjusting means mounted in said spring housing for changing the compression of said biasing spring, thereby modifying the magnitude of said first force and therefore the magnitude of said predetermined pressure.

18. The regulator valve assembly defined in claim 7 wherein said biasing mean comprise a helical biasing spring and said actuator means further includes a spring housing in which said biasing spring is disposed, said actuator body is in the form of sleeve with a substantially transverse divider member spaced from the ends of said sleeve, one end of said sleeve slidably engaging said valve housing in a gas tight fit to form said chamber and an opposite end of said sleeve being slidably inserted in said spring housing.

19. The regulator valve assembly defined in claim 7 wherein said valve member is a poppet valve, an annular valve seat being formed in said valve housing and an additional biasing spring arranged to urge said poppet valve against said valve seat.

20. The regulator valve according to claim 19 and further including a dust cover having a disk-like base and a central stem, said stem projecting through an opening in said valve housing, and a further biasing spring acting between said dust cover and said poppet valve.

21. The regulator valve assembly defined in claim 19 wherein said valve member has a first cylindrical portion spaced from said actuator means and a second cylindrical portion projecting towards said actuator means, said first cylindrical portion having a larger diameter than said second cylindrical portion, said valve member including a conically shaped portion joining said cylindrical portions, said valve housing having a circular aperture with an inside edge engageable by said conically shaped portion to form a gas tight seal.

22. The regulator valve assembly defined in claim 21 wherein said valve member has a longitudinal recess in said first cylindrical portion and said additional biasing spring has one end seated in said longitudinal recess.

23. A regulating valve for a fluid comprising:
(a) a first valve member;
(b) a second valve member disposed for movement with respect to said first valve member, one of said first and second valve members forming a valve seat and the other forming a sealing edge cooperating with said seat thereby forming an outlet valve;
(c) first biasing means biasing said second valve member against said first valve member so as to bring said sealing edge into contact with said seat to close said valve;
(d) an actuator for acting on said second valve member, said actuator having an outlet passage, said actuator supported for limited axial motion;
(e) means associated with said actuator forming an inner chamber in communication with said outlet passage, said inner chamber having an outer surface of area greater than the area of said outlet passage, and an outer chamber;
(f) at least one port formed in said actuator establishing communication between said inner chamber and said outlet passage;
(g) an axially adjustable support surface; and
(h) second biasing means disposed in said outer chamber between said support surface and said actuator, whereby axial inward movement of said actuator will cause it to move said seat and edge apart to permit a flow of fluid into said inner chamber and through said ports, said fluid thereupon acting over said outlet passage along with the biasing force of said second biasing means and aided by the biasing force of said first biasing means to tend to close the valve comprising said valve seat and edge as pressure builds up to the desired value to thereby obtain a regulating effect.

24. A regulator valve according to claim 23 wherein the fluid is a gas.

25. A regulator valve according to claim 24, for use in a gas cylinder having an opening formed therein, wherein said first valve member is adapted to be retained in the opening of the cylinder.

* * * * *